Nov. 17, 1959     G. S. MITCHELL     2,912,966
POWER LAWN MOWER HAVING STARTING MECHANISM
EASILY AVAILABLE TO OPERATOR
Filed Oct. 7, 1957
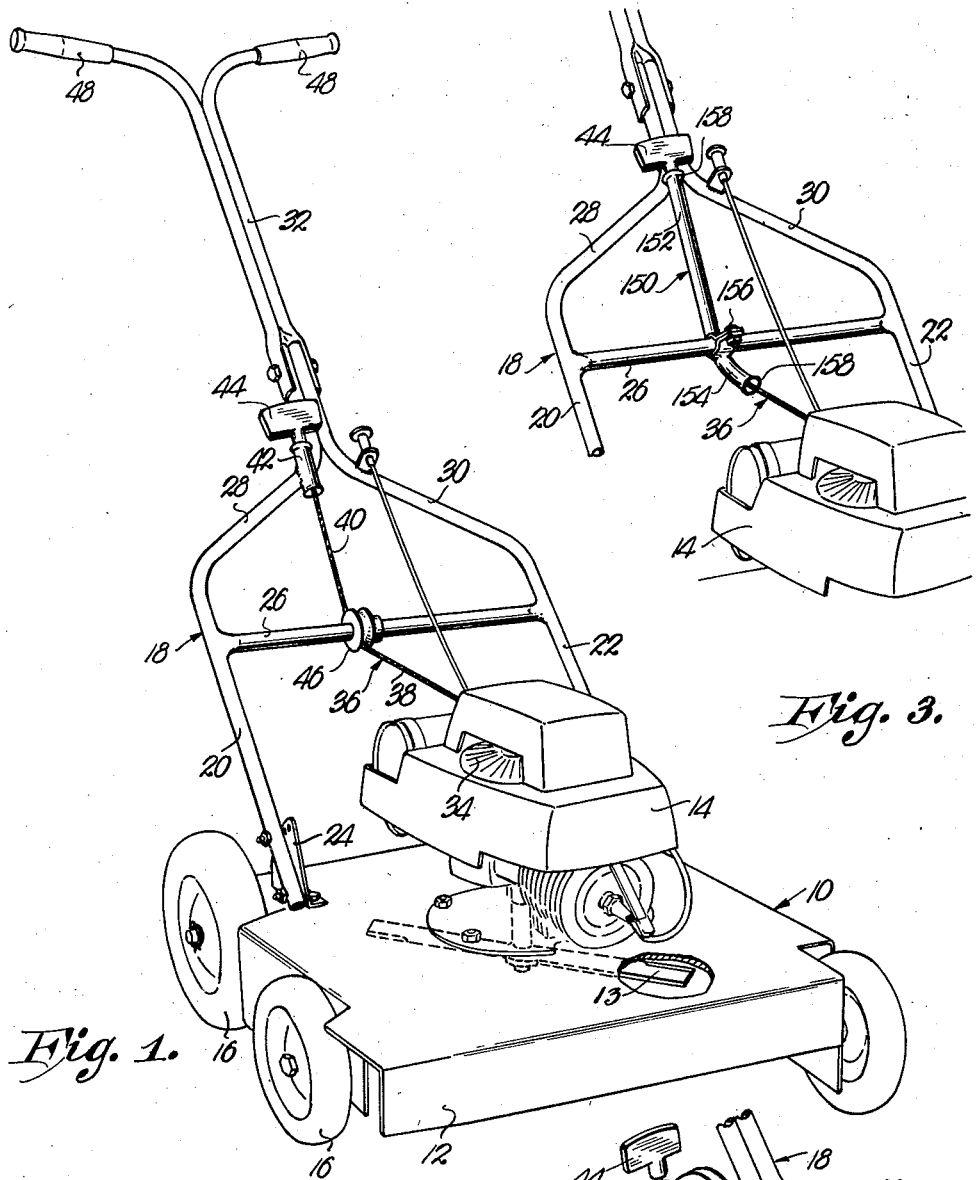
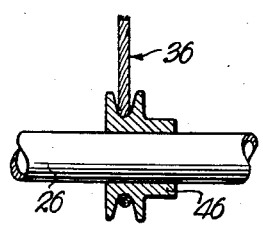
INVENTOR.
Greeley S. Mitchell
BY
ATTORNEY

United States Patent Office 2,912,966
Patented Nov. 17, 1959

2,912,966

POWER LAWN MOWER HAVING STARTING MECHANISM EASILY AVAILABLE TO OPERATOR

Greeley S. Mitchell, Monett, Mo.

Application October 7, 1957, Serial No. 688,620

4 Claims. (Cl. 123—179)

This invention relates to starter mechanism for power operated machines and, more particularly, to apparatus adapted to be mounted on power operated lawn mowers in a manner so that the gasoline engine of the mower may be started from a position remote from the part thereof containing the rotating blade structure.

Power operated lawn mowers, and especially those of the rotary type having a horizontally rotating cutter blade, have become increasingly popular during the last few years and are now being operated by persons of all ages and mechanical aptitudes. Considerable danger has been encountered with respect to starting of rotary type lawn mowers and many accidents have resulted from persons getting their feet and hands in the cutter blade during starting of the engine. These accidents have been principally caused by virtue of the fact that the person starting the engine must place one of his feet upon the lawn mower base in order to provide sufficient leverage during pulling of the recoil starter rope to overcome the compression within the cylinders of the engine. Placing of a foot or the like on the mower itself is particularly dangerous because many times the mower has a tendency to overturn during pulling of the starter rope and furthermore, because of the fact that oftentimes the grass being cut is wet and therefore the operator's shoes become damp and have a greater tendency to slip off of the base into a position where the foot may be cut with the cutter blade during pulling movement on the starter rope.

It is, therefore, the most important object of this invention to provide remote control starting mechanism for power operated lawn mowers whereby the operator of the mower may rotate the starter attached to the engine of the mower at a position remote from the cutter blade housing or base, thereby materially lessening the danger of the operator being injured during starting of the engine.

It is another important object of this invention to provide remote control starting mechanism as described which includes parts for maintaining the starter rope in a position adjacent and alongside the operating handle of the mower so that the operator may merely reach down to an intermediate position on the handle and pull the starter rope, thereby eliminating any necessity of his putting a foot on the base of the mower to obtain leverage during pulling of the starter rope.

Another important object of this invention is to provide guide means on the operating handle of the mower for guiding the rope during reciprocation thereof and assuring that the rope remains substantially tangential with the portion of the starter which the rope is wrapped about and in a plane substantially parallel with the top of the starter mechanism.

Other important objects of the invention include the provision of a slidable roller mounted on the operating handle of the mower and rotatably receiving the starter rope so that there will be little or no wear upon the rope during reciprocation thereof despite the fact that the direction of the rope is changed during reciprocation thereof and thus increasing the useful life of the starter rope; the provision of a pull handle on the outermost free end of the starter rope which not only facilitates reciprocation of the rope but also operates as a stop engageable with a tubular member on the operating handle of the mower to limit reciprocation of the outermost end of the rope toward the rotatable starter; the provision of economical and easily manufactured structure which may be attached to mowers already in existence or to new mowers during the manufacture thereof without making alterations in the conventional structure now employed; and other less important objects and details of construction which will become apparent as the following specification progresses.

In the drawing:

Figure 1 is a perspective view of one type of power operated lawn mower and illustrating one embodiment of the present invention mounted thereon;

Fig. 2 is a fragmentary, enlarged, cross-sectional view of the guide pulley illustrated in Fig. 1 and which reciprocably receives the starter rope;

Fig. 3 is a fragmentary, perspective view of the same type of mower and illustrating a modified type of remote control starter mechanism mounted thereon; and Fig. 4 is a fragmentary, enlarged, perspective view of a third type of remote control starter mechanism mounted on a rotary lawn mower.

A power operated rotary type lawn mower is designated broadly by the numeral 10 and includes as conventional parts thereof, a cutter blade housing or base 12 adapted to receive a horizontally rotatable cutter blade 13, a prime mover in the nature of a gasoline engine 14 having the drive shaft thereof disposed vertically and operably connected with the horizontal cutter blade 13, a plurality of wheels 16 rotatably mounted on base 12 in a manner to support the same, and an elongated operating handle broadly numerated 18 which is suitably secured to base 12. Handle 18 is substantially Y-shaped in configuration and is secured to base 12 in inverted relationship with the legs 20 and 22 thereof suitably secured to the uppermost face of base 12 by corresponding fastening brackets 24. A cross bar 26 interconnects legs 20 and 22 intermediate the ends thereof, and a pair of inwardly converging stretches 28 connect legs 20 and 22 respectively with main stretch 32 of handle 18.

Engine 14 is of the reciprocating piston type and is provided with a rotatable recoil starter 34 on the uppermost portion thereof provided with an elongated starter rope broadly designated 36 having one end thereof secured to bar of starter 34 while an adjacent length thereof is coiled about starter 34. It is pointed out that starter 34 is of the automatic recoil type so that upon pulling of rope 36 to rotate starter 34, the rope is automatically rewound upon starter 34 by virture of a spring (no shown) therein.

In the present invention rope 36 is of greater length than those normally provided wtih lawn mowers of this type and therefore, when rope 36 is in its fully coiled position around starter 34, the outermost free end of rope 36 extends outwardly from engine 14 to present a pair of integral stretches 38 and 40. An elongated tubular sleeve 42 is welded to stretch 28 of handle 18 adjacent the point where stretch 28 merges into main stretch 32 of handle 18. Sleeve 42 is mounted on the normally uppermost face of stretch 28 and is disposed with the longitudinal axis thereof in substantial alignment with the longitudinal axis of main stretch 32. Stretch 40 of rope 36 is threaded into sleeve 42 and a substantially T-shaped pull handle 44 is secured to the outermost portion of stretch 40 in a position so that the latter may engage the end of sleeve 42 away from engine 14.

A guide pulley 46 is rotatably and slidably mounted on cross bar 26 and rotatably receives rope 36 to thereby guide the same upon reciprocation of handle 44 and to assure that rope 36 comes off of starter 34 in proper tangential relationship and in substantial parallelism with the uppermost face of engine 14.

It can now be appreciated that the spring mechanism within starter 34 maintains rope 36 in coiled relationship about starter 34 and under sufficient bias to cause handle 44 to be moved into engagement with sleeve 42. Thus, a person operating mower 10 may readily start engine 14 by standing behind operating handle 18 and grasping handle 44 in order to reciprocate the same. Sufficient leverage to overcome the compression within the cylinders of engine 14 may be obtained by the operator holding onto the handle bars 48 of handle 18 while he pulls upwardly upon pull handle 44. It is also to be noted that because of the slidable mounting of pulley 46 upon cross bar 26, pulley 46 remains in alignment with the substantially horizontal stretch 38 of rope 36 as the same comes off of starter 34 and therefore prevents the rope 36 from coming off of pulley 46 during reciprocation of the former, and also prevents detrimental wear upon rope 36 as the same is pulled to start engine 14. Sleeve 42 operates not only as a stop for limiting movement of pull handle 44 toward engine 14 but also as a guide for directing movement of rope 36 as the same is reciprocated.

A modified form of the invention is illustrated in Fig. 3 of the drawings wherein all of the parts thereof are exactly identical with those illustrated in Fig. 1 with the exception of the tubular guide broadly designated 150 for guiding movement of starter rope 36 during reciprocation thereof. Tubular guide 150 comprises an elongated, substantially L-shaped member having an upper leg 152 and a lower, substantially shorter leg 154. A mounting bracket 156 is provided on guide 150 substantially at the zone of juncture between integral legs 152 and 154 and is suitably secured to cross bar 26 intermediate legs 20 and 22 of handle 18. The uppermost end of leg 152 of guide 150 is suitably secured to handle 18 adjacent the point of merger of stretches 28 and 30 of handle 18, whereby leg 152 lies in a plane substantially parallel with the longitudinal plane of handle 18. The lower leg 154 of guide 150 is positioned in substantial alignment with rope 36 emanating from starter 34 and the outermost ends of legs 152 and 154 are both flared as at 158 to prevent undue wear upon rope 36 as the latter is reciprocated. It can be seen in Fig. 3 that pull handle 44 bears against the uppermost end of tube 152 to limit extent of reciprocation of the outermost part of rope 36 toward engine 14.

Operation of the remote control starter mechanism illustrated in Fig. 3 is exactly identical with that of the mechanism shown in Figs. 1 and 2 and it can be seen that engine 14 may be readily started from a position behind operating handle 18 by merely pulling upwardly upon pull handle 44 of the mechanism illustrated in Fig. 3.

A third type of remote control starter mechanism is illustrated in Fig. 4 of the drawing wherein it can be seen that guide structure broadly designated by the numeral 260 is mounted on stretch 28 of handle 18 adjacent the point of juncture of stretch 28 and stretch 30. Structure 260 includes a substantially U-shaped bracket 262 comprising a pair of opposed L-shaped legs 264 and 266 attached to the upper face of stretch 28, as well as a substantially U-shaped upper member 268 integral with the uppermost ends of each of the legs 264 and 266. Member 268 likewise is provided with a crimped U-shaped section 270 intermediate the ends thereof for a purpose to be hereinafter defined.

A cross pin between the uppermost ends of legs 264 and 266 rotatably supports a pulley 246 which receives the outermost end of rope 36. Handle 44 on the outermost end of rope 36 is disposed above section 270 and it is to be noted that the distance between opposed sides of section 270 is less than the width of the smallest portion of handle 44 to thereby limit the extent of movement of handle 44 toward engine 14.

In this form of the invention pulley 46 and cross bar 26 may be eliminated if desired, and engine 14 may be readily started by pulling upwardly on handle 44 while handle bars 48 of handle 18 are grasped. The form of the invention illustrated in Fig. 4 is particularly useful in those types of recoil starters 34 wherein there is provided a small pulley adjacent the point at which the rope leaves the rotatable reel of the starter mechanism.

Although the starter mechanism of the present invention has been described with particular respect to a power operated lawn mower having a recoil starter thereon, it can be appreciated that the present structure is also utilizable in mowers of the type having non-recoil starters. However, the recoil type of starter is much more convenient and eliminates the necessity of manually rewinding the rope upon the starter each time it is desired to rotate such starter.

This application is a continuation in part of my co-pending application filed February 5, 1957, under the title of "Starting Mechanism for Lawn Mower Engines" and given Serial No. 638,274.

Having thus described the invention what is claimed as new and desired to be secured by Letters Patent is:

1. In combination with a standard gasoline driven lawn mower having a wheeled base, a cutter, gasoline power means, and a walking attendant-type mower handle of a length sufficient for said attendant to operate said mower from an upright position and having handle bars at one end and base attaching means at its other end; a remote control starting mechanism for said power means comprising a flexible cable having one end reciprocably connected to said power means, a grip at the other end of said cable, a cable grip stop member connected to said mower handle no closer to said handle base attaching means than the approximate mid-point between said handle bars and said handle base attaching means and within arms' length of said handle bars; whereby said handle grips serve to keep the operator's feet remote from said cutter, to brace the operator, and to afford the operator leverage when starting said mower; and an arcuate cable guide member on said mower handle between said stop member and said attaching means.

2. The combination of claim 1 and wherein said cable grip stop member is a tubular member and said cable is guided therein.

3. The combination of claim 1, said handle having a cross-bar between said cable grip stop member and said handle base attaching means, and wherein said arcuate guide member is a pulley slidably mounted on said cross-bar.

4. The combination of claim 1 and wherein said arcuate guide member and said cable grip stop member are integral and tubular.

References Cited in the file of this patent
UNITED STATES PATENTS

| | | |
|---|---|---|
| 227,743 | Donnelly | May 18, 1880 |
| 325,813 | Briggs | Sept. 8, 1885 |
| 1,182,531 | Doman | May 9, 1916 |
| 1,196,650 | Booty | Aug. 29, 1916 |
| 2,538,147 | Du Shane | Jan. 16, 1951 |
| 2,547,010 | Jackson | Apr. 3, 1951 |
| 2,561,008 | Burrows et al. | July 17, 1951 |
| 2,730,092 | Reif | Jan. 10, 1956 |
| 2,731,007 | Benson | Jan. 17, 1956 |
| 2,746,445 | Cocklin | May 22, 1956 |